United States Patent
Zhao et al.

(10) Patent No.: US 7,505,192 B1
(45) Date of Patent: Mar. 17, 2009

(54) OPTICAL APPARATUS HAVING A COMPOUND TRI-STATE NON-RECIPROCAL ROTATOR

(75) Inventors: Jing Zhao, Winchester, MA (US); Guanghai Jin, Boxborough, MA (US); Yongjun Shu, Woburn, MA (US)

(73) Assignee: Agiltron, Inc., Woburn, MA (US)

( * ) Notice: Subject to any disclaimer, the term of this patent is extended or adjusted under 35 U.S.C. 154(b) by 133 days.

(21) Appl. No.: 11/800,740

(22) Filed: May 7, 2007

Related U.S. Application Data

(60) Provisional application No. 60/810,663, filed on Jun. 5, 2006.

(51) Int. Cl.
  *G02F 1/09* (2006.01)
(52) U.S. Cl. ...................... 359/282; 359/281
(58) Field of Classification Search .......... 359/280–283
  See application file for complete search history.

(56) References Cited

U.S. PATENT DOCUMENTS

| | | | |
|---|---|---|---|
| 6,173,092 B1 | 1/2001 | Bergmann | |
| 6,392,784 B1 | 5/2002 | Ikeda | |
| 6,833,941 B2 | 12/2004 | Iwatsuka | |
| 6,867,895 B2 | 3/2005 | Nagaeda | |
| 7,027,198 B2 * | 4/2006 | Yao | ............................. 359/259 |
| 2004/0027673 A1 | 2/2004 | Nishikitani | |

* cited by examiner

*Primary Examiner*—William C Choi

(57) ABSTRACT

An optical apparatus and methods for operating on a polarization state of a light beam using a compound tri-state non-reciprocal rotator having two Faraday rotators. A first Faraday rotator rotates the polarization state into one of two partially rotated states at angles $+\alpha$, $-\alpha$, where $\alpha=22.5°$, and the second Faraday rotates the polarization state from one of the partially rotated states into one of three fully rotated states at angles $+2\alpha$, $0$, $-2\alpha$. A polarization selection mechanism guides light in the three fully rotated states differently to enable various devices and different modes of operation. For example, the polarization selection mechanism can generate a tri-state output in the form of two distinct output beams corresponding to two of the three fully rotated states, and an overlapping pair of output beams obtained when the compound tri-state non-reciprocal rotator produces the third of the three fully rotated states. The various methods permitted by the invention permit simple and cost-effective multicasting switches and methods.

17 Claims, 3 Drawing Sheets

OPTICAL APPARATUS HAVING A COMPOUND TRI-STATE NON-RECIPROCAL ROTATOR

RELATED APPLICATIONS

This patent application claims priority from Provisional Patent Application No. 60/810,663 filed on Jun. 5, 2006 and incorporated herein in its entirety.

FIELD OF THE INVENTION

This invention relates generally to compound tri-state non-reciprocal rotators such as Faraday rotators in optical devices such as switches for various optical routing functions including multicasting.

BACKGROUND ART

Optical switches are devices that route optical signals along selected fibers of an optical network. Such switches constitute the fundamental building blocks of modern optical networks. Optical switch performance is judged by switching speed, optical insertion loss, operation lifetime, size and cost. Prior art optical switches typically operate on mechanical and opto-electronic principles. Many opto-electronic switches use birefringent elements and various types of reciprocal and non-reciprocal polarization rotators to accomplish their switching functions.

Recent network architecture has introduced a new switching function, namely optical multicasting where a signal is sent along multiple optical paths simultaneously. This function is required in addition to the conventional switching function of routing the optical signals along individual light paths. The new networks are specifically designed for applications such as audio and video conferencing, as well as software and video distribution. In multicasting, the sender transmits a message only once. At each intermediate node, copies of the message are made as required and sent out to each link. Multicasting is very cost effective compared with multiple unicasting, because it requires only one copy of the data-bearing signal at any given node.

Currently, copies of data in the optical domain are obtained by light splitting with power splitters or with the aid of star couplers incorporated with wavelength division multiplexing (WDM), wavelength tuning and selection techniques. Power splitters or star couplers enforce a rigid optical path architecture that is not reconfigurable. Therefore, multicasting has to be performed by incorporating wavelength manipulation techniques within these rigid optical path architectures.

Optical layer multicast schemes include all optical wavelength conversion to bands containing multiple wavelengths. In general, these schemes require wavelength multiplexing of the data channel on the transmitter side and distribution of the wavelength-division-multiplexing signal to every receiver. Each receiver is designed to be able to select any channel on demand. This means that the system has to use expensive WDM transmitters and/or tunable lasers and/or tunable filters as well as an optical amplifier. Meanwhile, there is usually a limit to the total number of usable wavelengths imposed either by total signal power or dispersion encountered in the nonlinear medium. Therefore, there are certain limits to the scalability of these schemes and the high power requirement may be another drawback in nonlinear optical schemes.

Prior art optical switches are primarily based on mechanisms that perform mechanical movements, change waveguide coupling ratios, and perform polarization rotations. Non-mechanical, solid-state optical switches are more desirable due to their intrinsic high-speed operation, excellent reliability and low power consumption. Many non-mechanical configurations have been reported based on mechanisms such as liquid crystal polarization rotation, thermal heating induced optical birefringence change, magneto-optic polarization rotation, and electro-optic retardation that changes either optical phase or polarization. Several exemplary non-mechanical optical switches and switching mechanisms including non-reciprocal Faraday rotators are discussed in U.S. Pat. Nos. 6,173,092; 6,392,784; 6,833,941; 6,867,895 and U.S. Application No. 2004/0027673.

Although these mechanisms can be modified for multicasting, the required alterations increase the number of moving positions in mechanical switches, and require more precise control electronics in all types of switches, consequently leading to drawbacks in speed and reliability. In addition, the complexity of the optical and electronic configuration and high losses will impose additional amplification requirements. For example, the waveguide based optical multicasting device described by Siyun Yu et al., "Lossless optical packet multicast using active vertical coupler based optic cross-point switch matrix", IEEE, JLT, 2005 col. 23, p. 2984 require optical amplification due to intrinsically high loss deficiency and has to use the optical amplification. In addition, the fabrication costs for such a device are high.

For the above reasons, what is needed is a method and device for non-mechanical optical switching that can route an incoming light beam to multiple output ports simultaneously and on demand, while retaining the capability of conventional single port switching. In addition, such switches should be amenable to volume production. Moreover, in order to integrate these devices to compose the multicasting optical cross connects in scale, it would be particularly desirable to provide optical switches with low optical insertion loss and high speed switching that is reliable. Such devices should use fewer components of small size and require reduced alignment steps with large assembly tolerance to facilitate low cost manufacture.

OBJECTS AND ADVANTAGES

In view of the above prior art limitations, it is an object of the invention to provide an optical device that can employ cost-effective parts such as non-reciprocal rotators for switching a light beam to different output ports and also switching the light beam to two or more output ports simultaneously for multicasting functions.

It is a further object of the invention to provide a non-mechanical optical switching device and method compatible with optical fibers for performing routing functions including multicasting based on a few parts and at low overall cost.

These and other objects and advantages of the invention will become apparent from the ensuing description.

SUMMARY OF THE INVENTION

The objects and advantages of the invention are secured by an optical apparatus that has no moving parts and operates on a polarization state of a light beam with a compound tri-state non-reciprocal rotator. Specifically, the compound tri-state non-reciprocal rotator has a first Faraday rotator for rotating the polarization state into one of two partially rotated states at angles $+\alpha$, $-\alpha$, wherein $\alpha=22.5°$, and a second Faraday rotator that is in communication with the first Faraday rotator and operates in conjunction therewith. The second Faraday rotator rotates the polarization state from one of the partially rotated states into one of three fully rotated states at angles +2α, 0, −2α. A polarization selection mechanism guides light in the three fully rotated states differently. More precisely, polarization selection mechanism generates a tri-state output in the form of two distinct output beams corresponding to two of the three fully rotated states, and an overlapping pair of output beams corresponding to the third of the three fully rotated states.

The two distinct output beams are in fully rotated states at angles +2α, −2α with an angular separation of 4α between them. 4α is equal to 90° and renders these fully rotated states orthogonal to each other; hence easy to separate with conventional optical elements. In contrast, the overlapping pair of output beams corresponds to fully rotated state at angle 0, which is separated from fully rotated states by an angular separation of only 2α. 2α is equal to 45° and renders polarization in fully rotated state at angle 0 easy to split with conventional optical elements to generate the overlapping pair of output beams.

The geometric configuration of the optical apparatus can vary in many ways and the three fully rotated states can be selected among different sets of final polarization states. For example, in a first set of final polarizations angles +2α, 0, −2α of the fully rotated states correspond to final polarization states of +45', 0°, −45°. For a second set the angles +2α, 0, −2α correspond to final polarization states 0°, −45', −90°. Of course, these final polarization states can all be rotated by increments of 90° or as convenient for any particular application.

In a preferred embodiment, the compound tri-state non-reciprocal rotator employs latching Faraday rotators with magnetized cores. In fact, most preferably the Faraday rotators are garnet latching Faraday rotators and more specifically still, thin plate Faraday rotators. Each of the Faraday rotators has a field coil for applying a modulating magnetic field $B_m$ parallel to the direction of propagation of the light beam to induce the magneto-optic effect or Faraday effect. Each Faraday rotator also has an electromagnet made of a semi-hard magnetic material.

The polarization selection mechanism can take advantage of any known optical elements and combinations thereof to separate light in the three fully rotated polarization states. For example, the polarization selection mechanism can take advantage of birefringent elements such as birefringent crystals, reciprocal polarization rotators including plates of various optical thicknesses and elements employing the electro-optic, polarization-dependent beam path deflectors, polarization-dependent power splitters, as well as any other polarization sensitive elements.

The electro-optic apparatus can be employed in various situations, including free-space operation and in a fiber-optic network. In the latter case the apparatus can employ polarization-independent beam angle correctors for facilitating in coupling of the output beams into corresponding optical fibers. In such embodiments it is convenient to use a first port for admitting the light beam into the electro-optic apparatus and a second and third ports for receiving the two distinct output beams, respectively. In the same embodiments the overlapping pair of output beams can be sent to the second and third ports concurrently. All three ports can be fiber coupled in these embodiments.

The invention further extends to methods for operating on a polarization state of a light beam with the aid of a compound tri-state non-reciprocal rotator placed in the optical path of the light beam. The compound rotator has a first Faraday rotator and a second Faraday rotator in communication with the first Faraday rotator. The method calls for rotating the polarization state with the first Faraday rotator into one of two partially rotated states at angles +α, −α, wherein α=22.5°. Then rotating the polarization state from one of the two partially rotated states +α, −α into one of three fully rotated states at angles +2α, 0, −2α. Then guiding the light in the three fully rotated states according to the polarization state to generate tri-state output of two distinct output beams and an overlapping pair of output beams.

In a preferred embodiment of the method, the two distinct output beams correspond to the fully rotated states at angles +2α, −2α, and the overlapping pair of output beams corresponds to the fully rotated state at angle 0. The three fully rotated states can be selected among different sets of final polarization states. For example, in a first set of final polarizations angles +2α, 0, −2α of the fully rotated states correspond to final polarization states of +45', 0°, −45°. For a second set the angles +2α, 0, −2α correspond to final polarization states 0°, −45', −90'. The overlapping pair of output beams that corresponds to the fully rotated state at angle 0, i.e., in a final polarization state of 0° or 45° can be used for multicasting.

The apparatus of invention can be employed in making various electro-optic devices besides multicasting switches. A detailed description of the preferred embodiments of the invention is presented below in reference to the appended drawing figures.

BRIEF DESCRIPTION OF THE DRAWING FIGURES

DETAILED DESCRIPTION

Figure 1:
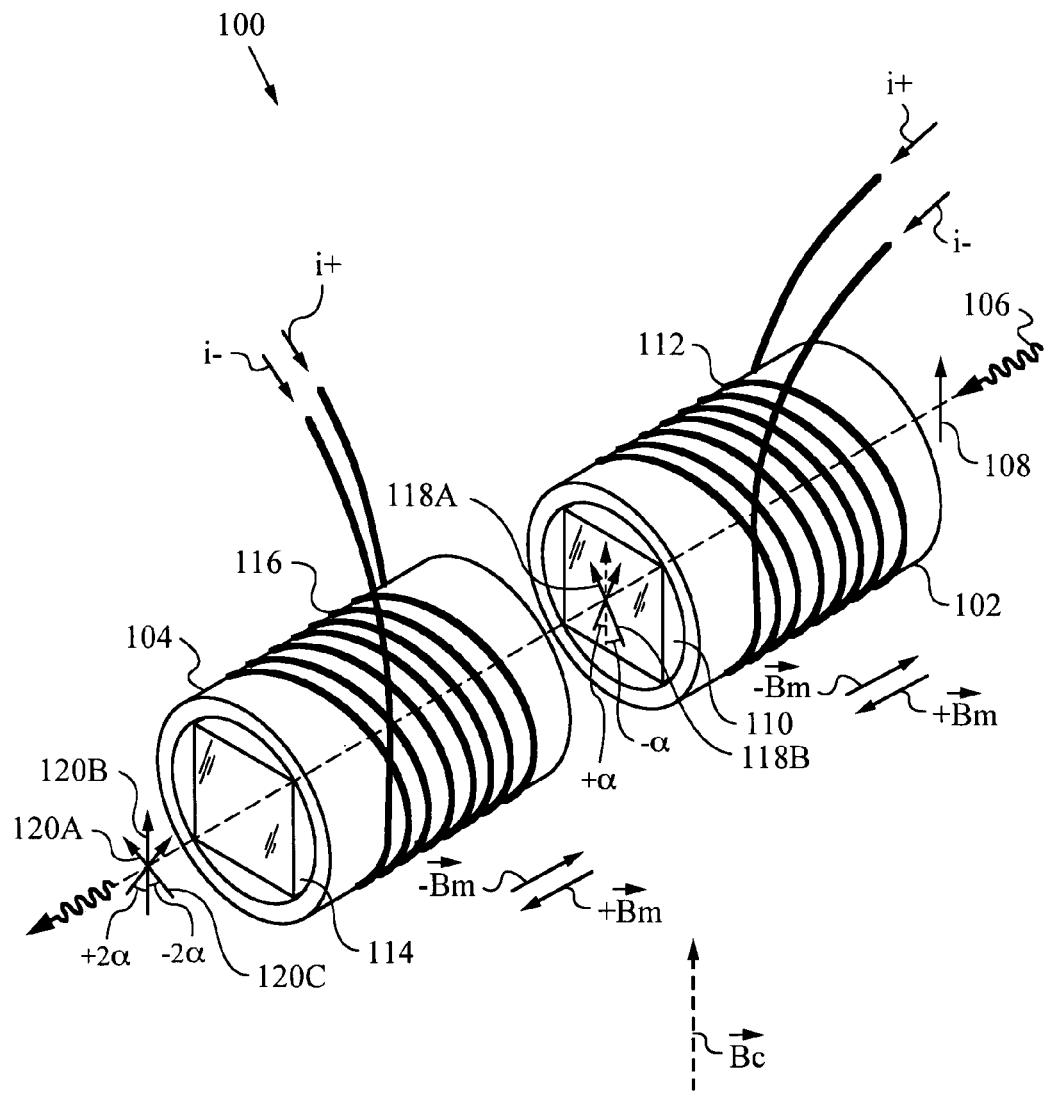
FIG. 1 is a three-dimensional diagram illustrating the basic principles of a compound tri-state non-reciprocal rotator in accordance with the invention.

Optical devices of the invention employ a compound tri-state non-reciprocal rotator 100 as shown in FIG. 1. Tri-state non-reciprocal rotator 100 is compound because it has two Faraday rotators; namely a first Faraday rotator 102 and a second Faraday rotator 104. Faraday rotators 102, 104 are in communication with each other and are arranged in series such that a light beam 106 passes through them in succession. Light beam 106 is in a linear polarization state indicated by arrow 108.

First Faraday rotator 102 has a core 110 and a field coil 112 surrounding core 110. Field coil 112 is designed for receiving a current i and applying a modulating magnetic field $B_m$ parallel to the direction of propagation of beam 106. More precisely, a forward current i+ passing through field coil 112 generates a modulating magnetic field $+B_m$ parallel and along the direction of propagation of beam 106. A reverse current i− generates a modulating magnetic field $-B_m$ parallel but directed against the direction of propagation of beam 106.

Second Faraday rotator 104 has a core 114 and a field coil 116 surrounding core 114. Field coil 116 is designed for applying modulating magnetic field $B_m$ in the same manner as coil 112. Namely, forward current i+ produces a modulating magnetic field $+B_m$ parallel and along the direction of propagation of beam 106, and reverse current i− generates a modulating magnetic field $-B_m$ parallel but directed against the direction of propagation of beam 106.

To produce the magneto-optic effect of non-reciprocal rotation of polarization 108 in Faraday rotators 102, 104 it is also necessary to apply a constant magnetic field $B_c$ transverse or parallel to the direction of propagation of light beam 106. As is well-known to those skilled in the art, such constant magnetic field $B_c$ can be generated with the aid of an external field coil or other mechanisms and will not be discussed further herein.

In a preferred embodiment, compound tri-state non-reciprocal rotator 100 employs Faraday rotators 102, 104 with magnetized cores 110, 114 that are made of a semi-hard magnetic material. Such cores latch into the desired magnetization state after the application of just one current pulse from the field coil. Most preferably, Faraday rotators 102, 104 are thin plate, garnet latching Faraday rotators. For example, Faraday rotators 102 and 104 have cores 110, 114 of a yttrium-iron-garnet (YIG), or Bi-added thick film crystals with a low field of saturation, e.g., less than 200(Oe) to reduce power consumption. One example of such materials is bismuth-substituted rare earth iron garnet single crystal system represented by a chemical formula $(GdRBi)_3(FeGaAl)_5O_{12}$, where R denotes at least one element selected from the group consisting of yttrium (Y), ytterbium (Yb) and lutetium (Lu). The electro-magnet coupled to Faraday rotators 102 and 104 comprises primarily copper coils. Ion (semi-hard magnetic, metallic) alloys are often incorporated into the electro-magnet to improve electrically induced magnetic field strength. Moreover, the residual magnetic field in those semi-hard magnetic metallic alloys after turning off the current can be used to achieve latching performance, although this is not essential for self-latching type garnets. Therefore, when using these preferred self-latching type garnet/latching core combinations, each rotator 102, 104 requires only one current pulse to switch its state from one to another and latches to the previous switching state even when the current is removed.

During operation, Faraday rotators 102, 104 communicate with each other to coordinate the fully rotated polarization state of light beam 106 that will issue from compound rotator 100. Since three fully rotated polarization states are possible, compound rotator 100 is referred to as tri-state.

First Faraday rotator 102 applies forward i+ or reverse current i– to field coil 112 to set up corresponding modulating magnetic field $+B_m$ or $-B_m$. As a result, rotator 102 produces a clock-wise or anti-clockwise rotation of polarization state 108 into one of two partially rotated states 118A, 118B at angles $+\alpha$ and $-\alpha$, where $\alpha=22.5°$. The angle of rotation $\alpha$ is determined by selecting the proper thickness of garnet core 110.

Second Faraday rotator 104 also applies forward i+ or reverse current i– to field coil 112 to set up corresponding modulating magnetic field $+B_m$ or $-B_m$. Depending on the orientation of modulating magnetic field applied by coil 112, partially rotated polarization states 118A, 118B can either be rotated further by rotation angle $\alpha$ or rotated back by $\alpha$ to produce zero effective polarization rotation. Once again, selection of proper thickness of garnet core 114 ensures that angle of rotation $\alpha$ is 22.5°.

Zero final polarization rotation is obtained in the case where modulating magnetic fields $B_m$ in first and second rotators 102, 104 are different, i.e., $+B_m$ and $-B_m$ or $-B_m$ and $+B_m$. On the other hand, when modulating magnetic fields $B_m$ in first and second rotators 102, 104 are the same, i.e., $+B_m$ and $+B_m$ or $-B_m$ and $-B_m$, the fully rotated states will be further rotated clock-wise or anti-clockwise by $+\alpha$ or $-\alpha$ to yield total angles $+2\alpha$ or $-2\alpha$. In other words, second Faraday rotator 104 rotates polarization state 108 from one of partially rotated states 118A, 118B produced by first Faraday rotator 102 into one of three fully rotated states 120A, 120B and 120C at angles $+2\alpha$, 0, $-2\alpha$, respectively.

To obtain the desired fully rotated state, first and second Faraday rotators 102, 104 operate in conjunction. Rotators 102, 104 have a choice of modulating magnetic fields $(+B_m, -B_m)$ or $(-B_m, +B_m)$ to generate fully rotated state 120B with zero final rotation. To obtain fully rotated states 120A, 120C rotators 102, 104 do not have a choice and must align their modulating magnetic fields; i.e., $(+B_m, +B_m)$ or $(-B_m, -B_m)$.

The three fully rotated states 120A, 120B, 120C corresponding to −45°, 0°, and 45° polarization rotations can be used for various optical functions including switching of light beam 106. It should be noted, that although other optical elements can be placed between rotators 102 and 104, it is the net effect of rotating polarization state 108 of light beam 106 into the three possible states by the compound Faraday rotator 100 that forms the basis for optical devices according to the present invention, including multicasting devices.

Figure 2:
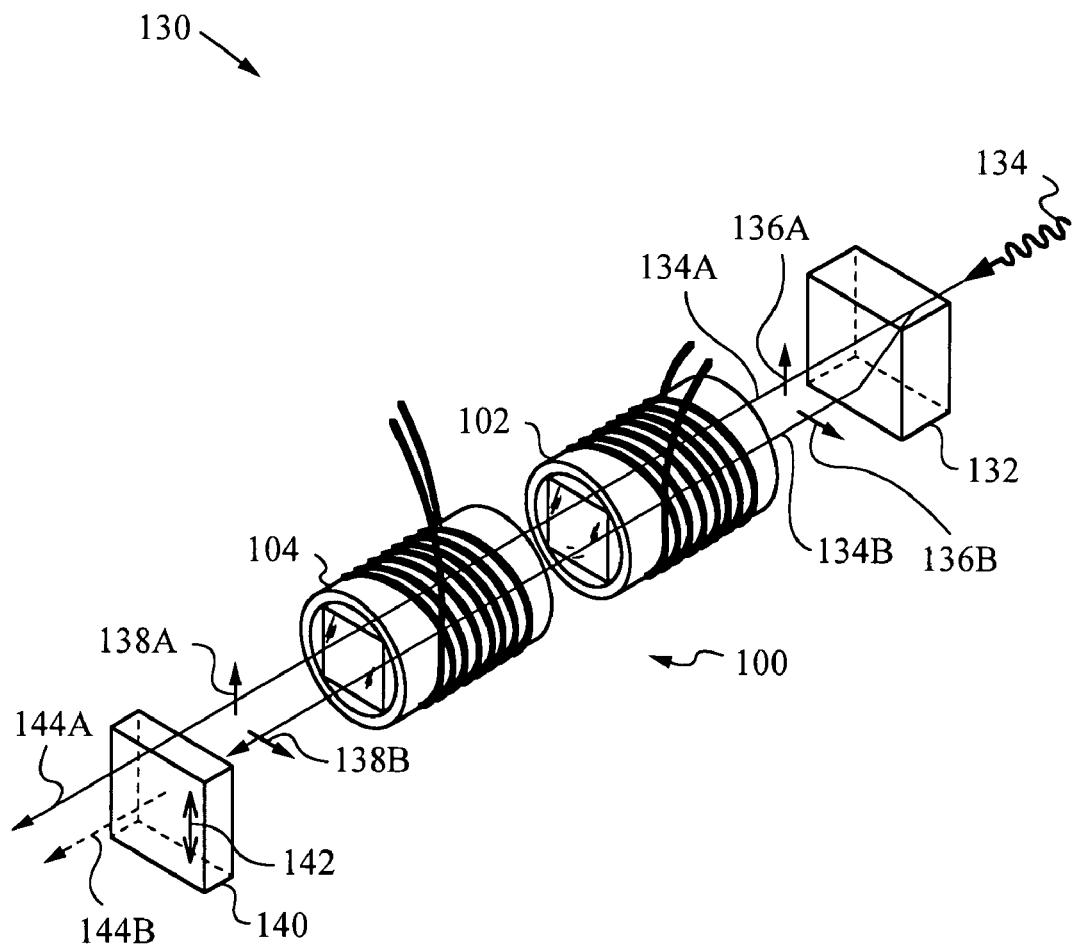
FIG. 2 is a three-dimensional diagram of a simple optical apparatus employing the compound tri-state non-reciprocal rotator of FIG. 1.

To illustrate the basics of operation, FIG. 2 shows a three-dimensional diagram of a very simple optical apparatus 130 employing compound tri-state non-reciprocal rotator 100 of FIG. 1. Apparatus 130 has a polarization separation mechanism 132 in the form of a birefringent splitter/combiner for breaking up normally unpolarized light beam 134 into light beams 134A, 134B in orthogonal polarization states 136A, 136B.

Light beams 134A, 134B are spatially offset and both travel in parallel through compound rotator 100. According to the above-described principles, rotator 100 rotates both orthogonal polarization states 136A, 136B by −45°, 0°, or +45° into fully rotated states 138A, 138B. In the example shown, fully rotated states 138A, 138B are rotated by 0° with respect to their original polarization states 136A, 136B.

Apparatus 130 has another polarization separation mechanism 140 in the form of a simple polarization filter or polarizer. As indicated by arrow 142, polarizer 140 passes all light in fully rotated state at 0° and at 180° with respect to polarization state 136A. On the other hand, polarizer 140 only passes about 50% of light whose polarization is at 45° to polarization direction arrow 142 and no light at 90° to arrow 142. Thus, since fully rotated state 138A is at 0 to arrow 142, light beam 134A passes through polarizer 140 to produce an output beam 144A. Meanwhile, light beam 134B in fully rotated state 138B at 90° to arrow 142 does not pass through polarizer 140 and produces no corresponding output beam 144B. On the other hand, when compound rotator 100 rotates both states 136A, 136B into fully rotated states at −45° or at 45' then about 50% of beam 134A and beam 134B pass through polarizer 140 and both corresponding output beams 144A, 144B are present. Because output beams 144A, 144B are spatially separated, they can be routed to different output ports by additional optical elements.

Of course, optical apparatus 130 is of limited practical use because output beams 144A, 144B are delivered in only one linear polarization state and the possible outputs are limited to output beam 144A, or output beams 144A and 144B without the ability to produce output beam 144B only. Several changes can be made to provide optical apparatus that are polarization independent and can be used in practical multicasting switches and other applications. These changes involve the use of various well-known optical devices and elements that rotate polarization and separate light based on its polarization including birefringent elements, polarization-dependent beam path deflectors, reciprocal polarization rotators, polarization-independent beam angle correctors and many others. A person skilled in the art will recognize that a great variety of optical apparatus can be built by using the compound tri-state non-reciprocal rotator of the present invention as the core building block.

Figure 3:
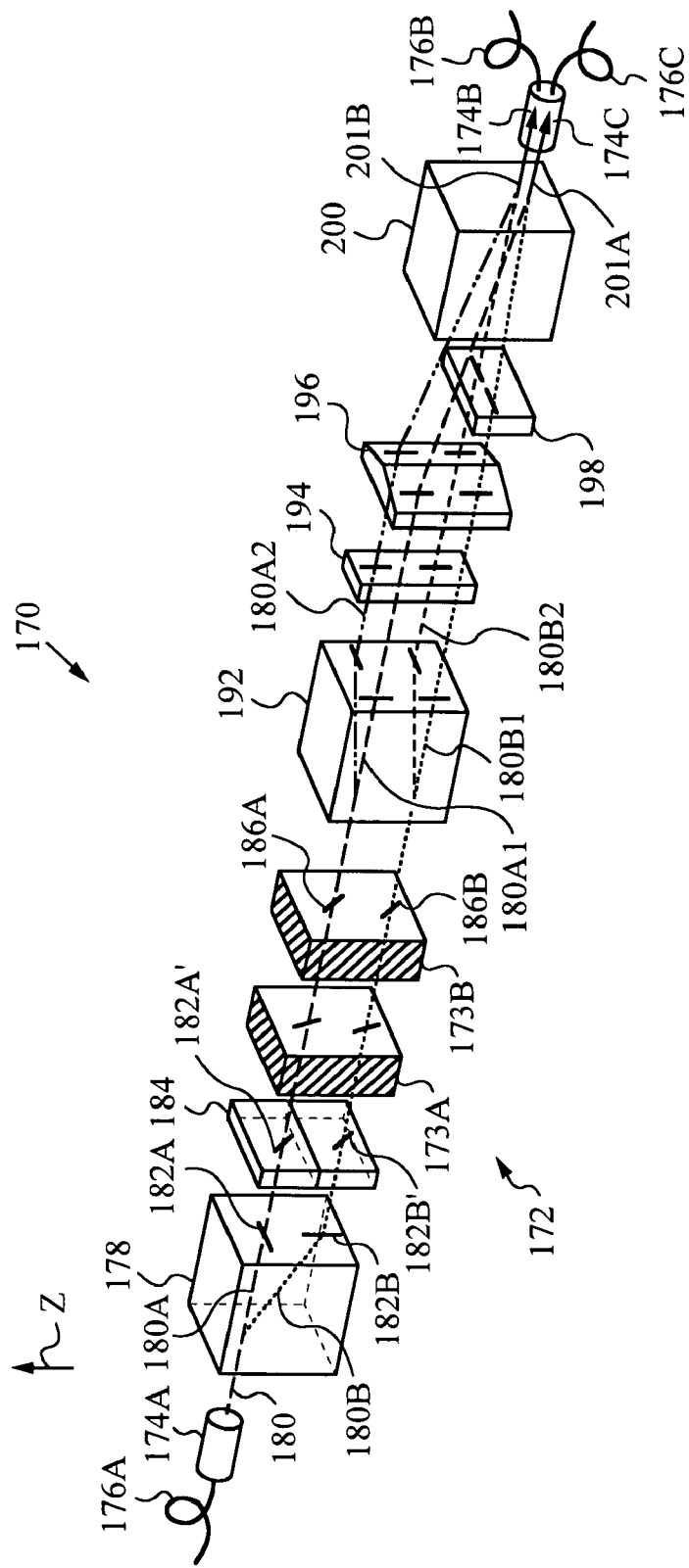
FIG. 3 is a schematic view of a 1×2 multicasting switch according to the invention.

FIG. 3 depicts an optical apparatus 170 of the invention in the form of a 1×2 magneto-optic multicasting switch built around a compound tri-state non-reciprocal rotator 172 employing two Faraday rotators 173A, 173B. Switch 170 has three ports 174A, 174B and 174C coupled with optical fibers 176A, 176B, 176C, respectively. Ports 174A, 174B, 174C may include suitable graded index lenses (GRIN lenses) and ferrules with bores for retaining optical fibers 176A, 176B, 176C as well as other elements well-known to those skilled in the art but not explicitly shown herein.

Apparatus 170 has a first polarization separation mechanism in the form of a birefringent walk-off element 178 for separating a light beam 180 issuing from port 174A into two component beams 180A, 180B with orthogonal polarization states 182A, 182B. A reciprocal polarization rotator in the form of a half-aperture halfwave plate 184 is positioned after polarization separation element 178 to rotate polarization states 182A, 182B to polarization states 182A', 182B' which are parallel.

Positioned next is compound rotator 172 for rotating polarization states 182A', 182B' into fully rotated states 186A, 186B. Depending on usage, compound rotator 172 can be modified with additional polarization control elements such that fully rotated states 186A, 186B belong to different sets of fully rotated states. For example, fully rotated states 186A, 186B in an unmodified compound rotator 172 belong to a first set in which angles +2α, 0, −2α correspond to final polarization states of +45°, 0°, −45° with respect to polarization states 182A', 182B' rendered parallel by half-aperture halfwave plate 184. Alternatively, fully rotated states 186A, 186B can belong to a second set in which angles +2α, 0, −2α correspond to final polarization states 0°, −45°, −90° with respect to polarization states 182A', 182B'. The second set can be achieved, for example, by including a constant polarization rotation element, e.g., a waveplate between the Faraday rotators 173A, 173B.

In this embodiment, fully rotated states 186A, 186B belong to the first set of polarization states. In other words, the tri-state output of compound rotator 172 produces three possible fully rotated polarization states 186A, 186B with respect to polarization states 182A', 182B' and these are +45°, 0°, and −45'.

A second polarization separation mechanism 192 in the form of a birefringent element is positioned after compound rotator 172. Birefringent element 192 is oriented such that it walks off light beams 180A and 180B laterally based on their polarization states to produce four polarized beams 180A1, 180A2 and 180B1, 180B2.

Birefringent element 192 is followed by a second reciprocal polarization rotator 194 in the form of a half-aperture halfwave plate. Plate 194 is positioned in the optical path of beams 180A2, 180B2. Plate 194 rotates the polarization states of beams 180A2, 180B2 that are walked-off laterally to the right by element 192 such that all four polarized beams 180A1, 180A2, 180B1, 180B2 are in the same polarization state.

Apparatus 170 has a polarization-independent beam angle corrector 196 in the form of a prism. Prism 196 has two facets for pair-wise adjustment of the propagation angles of beams 180A1, 180B1 and beams 180A2, 180B2. A person skilled in the art will appreciate that adjustment of the apex angles of the facets based on Snell's law permits one to exercise precise control over the propagation angles of all beams 180A1, 180A2, 180B1, 180B2.

A third reciprocal polarization rotator 198 in the form of a half-aperture halfwave plate is positioned after prism 196. Plate 198 is located in the optical path of beams 180A2 and 180B2 to rotate the polarization states of those beams by 90° such that they are orthogonal to the polarization states of beams 180A1 and 180B1.

Apparatus 170 has a third polarization separation mechanism 200 in the form of a birefringent element. Element 200 is actually used for polarization combining rather than polarization splitting, as was the case with elements 178, 192. Specifically, element 200 combines pairs of beams with orthogonal polarizations, namely beams 180A1, 180B1 and beams 180A2, 180B2 into two output beams 201A, 201B that propagate at slightly different angles thanks to the angular adjustment imparted by prism 196. The combined beams are coupled into fibers 176B and 176C via output ports 174B, 174C, respectively.

During operation light beam 180 enters switch 170 via port 174A from optical fiber 176A. Birefringent walk-off element 178 separates beam 180 into two component beams 180A, 180B with orthogonal polarization states 182A, 182B. Half-aperture halfwave plate 184 rotates polarization states 182A, 182B to polarization states 182A', 182B' which are parallel and at 45° to the z-direction indicated by the arrow.

Prepared in the above manner, beams 180A, 180B enter compound rotator 172 and are rotated to fully rotated states 186A, 186B which belong to the set of fully rotated angles +2α, 0, −2α correspond to final polarization states of +45°, 0°, −45° with respect to polarization states 182A', 182B'. In other words, final polarization states can be at 0°, 45° or 90° with respect to the z-direction. In the example shown, the fully rotated states 186A, 186B are at 45° to the z-direction. Under this condition switch 170 is in the multicasting mode as we will see shortly below.

Since fully rotated states 186A, 186B are at 45° to the z-direction then, by the rules of quantum mechanics, beams 180A, 180B contain light that can be separated by birefringent element 192 into two orthogonal polarizations at 0° and at 90° with respect to the z-direction. Thus, beams 180A, 180B are walked off laterally to produce four polarized beams 180A1, 180A2, 180B1 and 180B2.

Plate 194 rotates the polarization states of beams 180A2, 180B2 so that all four polarized beams 180A1, 180A2, 180B1, 180B2 are in the same polarization state, namely at 0° with respect to the z-direction. Then, prism 196 adjusts the propagation angles of beams 180A1, 180B1 and beams 180A2, 180B2 for proper in-coupling into fibers 176B, 176C at ports 174B, 174C. Next, half-aperture halfwave plate 198 rotates the polarization states of beams 180A2 and 180B2 by 90° such that they are orthogonal to the polarization states of beams 180A1 and 180B1. Finally, birefringent element 200 combines pairs of beams 180A1, 180B1 and 180A2, 180B2 into a pair of output beams 201A, 201B that propagate at slightly different angles thanks to the angular adjustment imparted by prism 196. The combined beams are coupled into fibers 176B and 176C via output ports 174B, 174C, respectively. In this manner, switch 170 creates two copies of light beam 180 in the form of polarization independent overlapping pair of output beams 201A, 201B and is thus performing the fundamental function of multicasting.

On the other hand, when fully rotated states 186A, 186B are at 0° or at 90° to the z-direction, switch 170 acts as a regular routing switch and no overlapping output beams are produced. Specifically, when fully rotated states 186A, 186B are at 0 or at 90° to the z-direction then, by the rules of quantum mechanics, beams 180A, 180B do not contain light that can be separated by birefringent element 192. Instead, when fully rotated states 186A, 186B are at 0° to the z-direction element 192 passes only beams 180A1, 180B1. Beams 180A1, 180B1 undergo the same operations as described above and, after combining in element 200, issue in the form of just one distinct output beam 201A through output port 174C to optical fiber 176C. When fully rotated states 186A, 186B are at 90° to the z-direction element 192 passes only beams 180A2, 180B2. Beams 180A2, 180B2 also undergo the same operations as described above and are combined as one distinct output beam 201B issuing through output port 174B.

Switch 170 can thus be used in an optical network for both switching and multicasting functions. In the switching mode light beam 180 is admitted via first port 174A and is routed either to output port 174B or output port 174C. In the multicasting mode switch 170 uses fully rotated states 186A, 186B at 45° to the z-direction to obtain the pair of overlapping output beams 201A, 201B and sends them to output ports 174B, 174C concurrently. Since beams 201A, 201B are polarization independent, they can be further remitted in any typical optical network. Of course, some attenuation is incurred due to this operation and a person skilled in the art will appreciate that appropriate optical signal amplification may be used to increase signal strength as necessary or as desired.

Among many advantages, optical apparatus constructed in accordance with the invention has the advantage of being simple to make and low-cost. In addition, it is entirely non-mechanical and hence scalable to routing situations in which very rapid and repeatable routing performance is required.

The present invention is described in terms of special optical switch embodiments having specific components and having a specific configuration. However, one of ordinary skill in the art will readily recognize that this method and system will operate effectively for other components having similar properties, other configurations, and other relationships between components.

Clearly, the apparatus and method of invention are highly scalable and other embodiments of the apparatus and method are possible. Therefore, the scope of the invention should be judged by the appended claims and their legal equivalents.

We claim:

1. An optical apparatus for operating on a polarization state of a light beam, said optical apparatus comprising:
    a) a compound tri-state non-reciprocal rotator placed in the optical path of said light beam and having:
        1) a first Faraday rotator for rotating said polarization state into one of two partially rotated states at angles $+\alpha$, $-\alpha$, wherein $\alpha=22.5°$;
        2) a second Faraday rotator in communication with said first Faraday rotator for rotating said polarization state from said one of two partially rotated states at angles $+\alpha$, $-\alpha$ into one of three fully rotated states at angles $+2\alpha$, 0, $-2\alpha$;
    b) a polarization selection means for guiding light in said three fully rotated states to generate a tri-state output comprising two distinct output beams and an overlapping pair of output beams.

2. The optical apparatus of claim 1, wherein said two distinct output beams correspond to said fully rotated states at angles $+2\alpha$, $-2\alpha$, and said overlapping pair of output beams corresponds to said fully rotated state at angle 0.

3. The optical apparatus of claim 2, wherein said three fully rotated states are selected among a first set in which angles $+2\alpha$, 0, $-2\alpha$: correspond to final polarization states of $+45°$, $0°$, $-45°$ and a second set in which angles $+2\alpha$, 0, $-2\alpha$ correspond to final polarization states $0°$, $-45°$, $-90°$.

4. The optical apparatus of claim 1, wherein at least one of said first Faraday rotator and said second Faraday rotator comprises a latching Faraday rotator.

5. The optical apparatus of claim 4, wherein said latching Faraday rotator comprises a garnet latching Faraday rotator.

6. The optical apparatus of claim 1, wherein at least one of said first Faraday rotator and said second Faraday rotator comprises a thin plate Faraday rotator.

7. The optical apparatus of claim 1, wherein at least one of said first Faraday rotator and said second Faraday rotator comprises a field coil for applying a modulating magnetic field $B_m$ and an electromagnet of a semi-hard magnetic material.

8. The optical apparatus of claim 1, wherein said polarization selection means comprises a birefringent element.

9. The optical apparatus of claim 1, wherein said polarization selection means comprises a polarization-dependent beam path deflector.

10. The optical apparatus of claim 1, further comprising a reciprocal polarization rotator.

11. The optical apparatus of claim 1, further comprising a polarization-independent beam angle corrector.

12. The optical apparatus of claim 1, further comprising:
    a) a first port for admitting said light beam into said optical apparatus;
    b) a second port and a third port for receiving said two distinct output beams, respectively;
    wherein said overlapping pair of output beams is received by said second port and said third port concurrently.

13. The optical apparatus of claim 12, wherein said first port, said second port and said third port are fiber coupled.

14. A method for operating on a polarization state of a light beam comprising:
    a) placing a compound tri-state non-reciprocal rotator having a first Faraday rotator and a second Faraday rotator in communication with said first Faraday rotator in the optical path of said light beam;
    b) rotating said polarization state with said first Faraday rotator into one of two partially rotated states at angles $+\alpha$, $-\alpha$, wherein $\alpha=22.5°$;
    c) rotating said polarization state from said one of two partially rotated states at angles $+\alpha$, $-\alpha$ into one of three fully rotated states at angles $+2\alpha$, 0, $-2\alpha$;
    d) guiding light in said three fully rotated states according to said polarization state to generate a tri-state output comprising two distinct output beams and an overlapping pair of output beams.

15. The method of claim 14, wherein said two distinct output beams correspond to said fully rotated states at angles $+2\alpha$, $-2\alpha$, and said overlapping pair of output beams corresponds to said fully rotated state at angle 0.

16. The method of claim 15, wherein said three fully rotated states are selected among a first set in which angles $+2\alpha$, 0, $-2\alpha$ correspond to final polarization states of $+45°$, $0°$, $-45°$ and a second set in which angles $+2\alpha$, 0, $-2\alpha$ correspond to final polarization states $0°$, $-45°$, $-90°$.

17. The method of claim 15, wherein said overlapping pair of output beams that corresponds to said fully rotated state at angle 0 is used for multicasting.

* * * * *